Aug. 8, 1939.  H. SELIGER ET AL  2,168,750
PRODUCTION OF METALLIC MAGNESIUM
Filed March 28, 1938
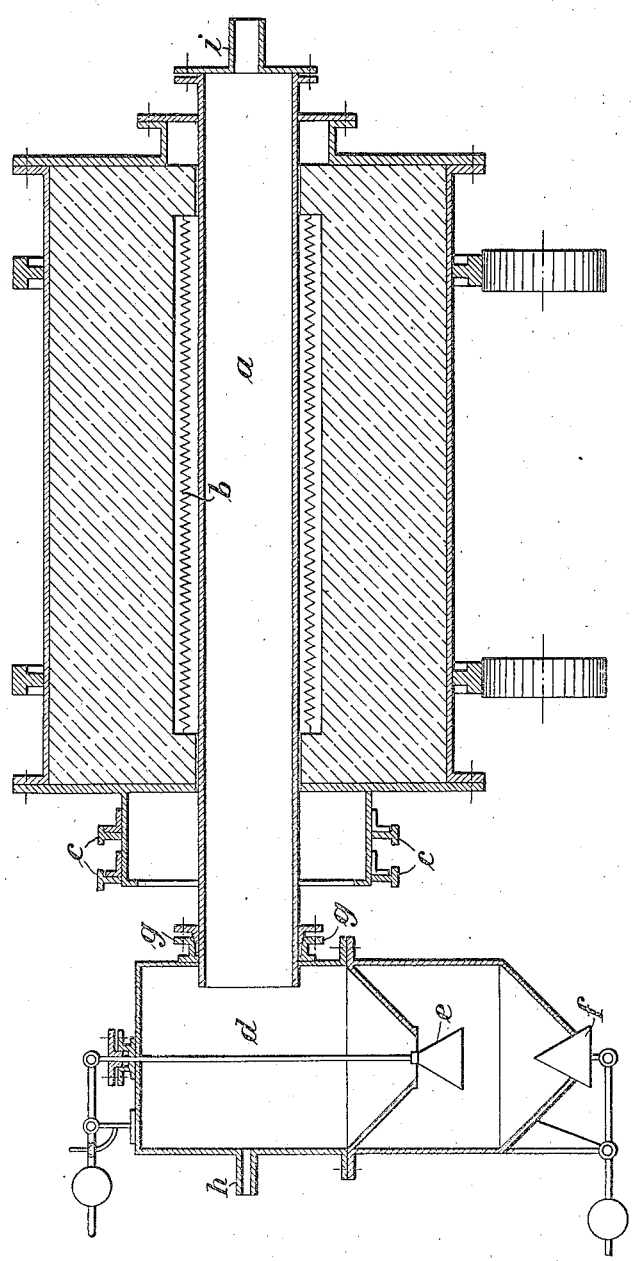
Inventors
Hellmuth Seliger and
Otto Bretschneider
By his Attorney Patented Aug. 8, 1939

2,168,750

UNITED STATES PATENT OFFICE 2,168,750

PRODUCTION OF METALLIC MAGNESIUM

Hellmuth Seliger and Otto Bretschneider, Bitterfeld, Germany, assignors, by mesne assignments, to Magnesium Development Corporation, a corporation of Delaware Application March 28, 1938, Serial No. 198,352
In Germany April 5, 1937

5 Claims. (Cl. 75—67)

This invention relates to the production of metallic magnesium by the reduction of burnt dolomite or magnesite with the aid of a reducing agent such as silicon (ferrosilicon) or aluminium.

The present invention aims at obviating or greatly minimising the dust disadvantages liable to occur during reaction of the reaction mixture.

To this end, the present invention consists in imparting suitable shape to the pulverulent reaction mixture which is thereupon heated in an atmosphere of hydrogen or equivalent gas to temperatures of from 700° to 1200° C. until hardening takes place.

The thermal production of magnesium by the reduction of burnt dolomite or magnesite with the aid of silicon (ferrosilicon) or aluminium is preferably carried out in furnaces in which the charge is subjected to radiant heat. In said furnaces the transmission of heat can be considerably improved by moving the reaction material. In horizontal furnaces the material may be most simply kept in motion by imparting a rotary movement to the furnace, whilst in shaft furnaces the movement is obtained by the charge sliding down by its own weight.

In order to ensure a satisfactory movement of the reaction mixture in furnaces of the foregoing kinds, it has been suggested to convert said mixture, which is initially a powder, into the form of pressed shaped pieces or briquettes. However, even when using high pressures in the pressing operation, for example from 1000 to 2000 kgs. per sq. cm., the coherence of the resulting shaped pieces is insufficient to prevent attrition, with the result that sufficient powder is rubbed off during the movement in the furnace, to give rise to various disturbances in operation. Thus, this powder agglomerates to form solid deposits on the interior walls of the furnace chamber. Moreover it leads to the formation of lumps in consequence of several shaped pieces caking together, thus considerably hampering the even movement of the material. In furnaces operated under reduced pressure, in which suction is applied, in the usual way, behind the condensing chamber, any dust formed in the furnace tends to be entrained into the condensing chamber and thus to contaminate the metal condensed in the latter.

In one embodiment of the invention, given by way of example, the pulverulent reaction mixture, after conversion into shaped pieces, is heated for a short time, for example, 5 to 30 minutes, depending on the size of said shaped pieces, in an atmosphere of hydrogen to temperatures of from 700° to 1200° C. as a result of which said shaped pieces acquire the hardness of stone. If silicon be used as reducing agent, the hardening is preferably effected at temperatures lying in the upper portion of the temperature range indicated, while when aluminium is used, the lower portion of said range is preferably employed.

This hardening appears to be attributable to the fact that in the aforesaid temperature range a reaction is initiated, with formation of alloys or compounds of calcium with silicon or aluminium respectively, without magnesium being as yet liberated. This assumption is borne out by the fact that if burnt magnesite is utilised as initial material, a certain amount of burnt lime must be added thereto, in order that the formation of the calcium alloy necessary for the hardening may take place.

The accompanying drawing shows diagrammatically and by way of example a longitudinal section through a rotary furnace suitable for continuously carrying out the specific embodiment of the process of the present invention hereinbefore described.

In said drawing, $a$ denotes a non-scaling iron tube, $b$ chrome-nickel heating resistance to which electric current is supplied through slip rings $c$, $d$ is a sheet iron container having valves $e$ and $f$ and sealed against the rotating tube by a stuffing-box $g$. $h$ is the inlet and $i$ the outlet for hydrogen or equivalent gas. The furnace is charged by introducing the shaped pieces into the rotary tube at $i$. The rate of throughput is so adjusted that the hardening of the shaped pieces is completed when they have reached the end of the rotating tube. After passing through the rotating furnace, the hardened shaped pieces fall into the container $d$, the valve $e$ of which is opened. The container is emptied intermittently by opening valve $f$, after the valve $e$ has been closed.

The hydrogen introduced into the tube $a$ at $h$ merely serves to protect the shaped pieces from reaction with the oxygen or nitrogen of the atmosphere at the temperatures prevailing therein and it may therefore be replaced by any other gas adapted to fulfill the same function.

The hereindescribed process of preparation affords the further advantage that shaped pieces of reaction mixture may be made with the use of lower pressures (250 to 500 kgs. per sq. cm.). This enables pieces of relatively large size to be made, as a result of which the output of the moulding press is considerably increased. When such large shaped pieces have undergone the hardening treatment of the present invention, they can be broken up to any desired size, for example by a roller crusher, and can then be introduced into the actual reaction furnace in which the reduction and distilling off of the magnesium take place at temperatures of the order of 1250° C. and more.

The reaction mixtures subjected to the thermal hardening process of the present invention may contain certain fluorides in amounts of 0.5 to 5% as described in U. S. patent specification No. 2,103,976 for the purpose of accelerating the reduction of the magnesium oxide.

By way of example, the following originating mixtures have been found suitable for carrying out the process of the present invention:

(1) 100 parts by weight of burnt dolomite (36.5% MgO) +13.8 parts by weight of ferrosilicon (93%).

(2) 100 parts by weight of burnt dolomite (36.5% MgO) +13.8 parts by weight of ferrosilicon (93%) +2 parts by weight of fluorspar.

(3) 100 parts by weight of burnt magnesite (90%) +133 parts by weight of burnt lime (94%) +33.5 parts by weight of ferrosilicon (93%).

(4) 100 parts by weight of burnt dolomite (36.5% MgO) +16.3 parts by weight of granular aluminium.

We claim:

1. A process for the thermal production of magnesium by the reduction of a substance containing magnesium oxide with the aid of a reducing agent taken from the group consisting of silicon, ferrosilicon and aluminium, which comprises imparting suitable shape to the pulverulent reaction mixture comprising magnesium oxide, calcium oxide and the reducing agent, thereupon heating the shaped mixture in an inert atmosphere to temperatures between about 700 and about 1200° C. until at least superficial hardening has taken place, and thereafter heating said hardened mixture to temperatures adapted to cause generation of magnesium vapours, while condensing such magnesium vapours to form metallic magnesium.

2. A process for the thermal production of magnesium by reduction of burnt magnesite with the aid of a reducing agent taken from the group consisting of silicon, ferrosilicon and aluminium which comprises adding a minor quantity of burnt lime to the reaction mixture comprising burnt magnesite and the reducing agent, imparting suitable shape to the pulverulent reaction mixture including the burnt lime, thereupon heating the shaped mixture in an inert atmosphere to temperatures between about 700 and about 1200° C. until at least superficial hardening has taken place, and thereafter heating said hardened mixture to temperatures adapted to cause generation of magnesium vapours, while condensing such magnesium vapours to form metallic magnesium.

3. A process for the thermal production of magnesium by the reduction of a substance containing magnesium oxide with the aid of a reducing agent taken from the group consisting of silicon, ferrosilicon and aluminium, which comprises adding a minor quantity of a fluoride to the reaction mixture comprising magnesium oxide, calcium oxide and the reducing agent, imparting suitable shape to the pulverulent reaction mixture including the fluoride, thereupon heating the shaped mixture in an inert atmosphere to temperatures between about 700 and about 1200° C. until at least superficial hardening has taken place, and thereafter heating said hardened mixture to temperatures adapted to cause generation of magnesium vapours to form metallic magnesium.

4. A process for the thermal production of magnesium by reduction of burnt magnesite with the aid of a reducing agent taken from the group consisting of silicon, ferrosilicon and aluminium, which comprises adding a minor quantity of burnt lime and also a minor quantity of a fluoride to the reaction mixture comprising burnt magnesite and the reducing agent, imparting suitable shape to the pulverulent reaction mixture including the burnt lime and the fluoride, thereupon heating the shaped mixture in an inert atmosphere to temperatures between about 700 and about 1200° C. until at least superficial hardening has taken place, and thereafter heating said hardened mixture to temperatures adapted to cause generation of magnesium vapours, while condensing such magnesium vapours to form metallic magnesium.

5. A process for the thermal production of magnesium by reduction of burnt dolomite with the aid of a reducing agent taken from the group consisting of silicon, ferrosilicon and aluminium which comprises imparting suitable shape to the pulverulent reaction mixture comprising burnt dolomite and the reducing agent, thereupon heating the shaped mixture in an inert atmosphere to temperatures between about 700 and about 1200° C. until at least superficial hardening has taken place, and thereafter heating said hardened mixture to temperatures adapted to cause generation of magnesium vapours, while condensing such magnesium vapours to form metallic magnesium.

HELLMUTH SELIGER.
OTTO BRETSCHNEIDER.